United States Patent
Lee

(10) Patent No.: US 8,919,544 B2
(45) Date of Patent: *Dec. 30, 2014

(54) HOLDER FOR PORTABLE ELECTRONIC DEVICE

(71) Applicant: Chi Mei Communication Systems, Inc., New Taipei (TW)

(72) Inventor: Chueh Lee, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/862,895

(22) Filed: Apr. 15, 2013

(65) Prior Publication Data

US 2013/0284614 A1    Oct. 31, 2013

(30) Foreign Application Priority Data

Apr. 27, 2012 (TW) .............................. 101208016 U

(51) Int. Cl.
  *B65D 25/20*   (2006.01)
  *A45C 11/00*   (2006.01)
  *G06F 1/16*    (2006.01)

(52) U.S. Cl.
  CPC .............. *A45C 11/00* (2013.01); *G06F 1/1626* (2013.01); *G06F 1/1656* (2013.01); *A45C 2011/003* (2013.01); *A45C 2200/15* (2013.01)
  USPC .......................... 206/45.24; 206/320; 248/459

(58) Field of Classification Search
  CPC ................... A45C 2011/002; A45C 2011/003; G06F 1/1628

USPC ............... 206/45.2, 45.23, 45.24, 320, 45.25, 206/45.26, 762, 768; 248/459
  See application file for complete search history.

(56) References Cited

U.S. PATENT DOCUMENTS

| 7,545,634 B2 | 6/2009 | Simonian et al. |
| D639,296 S   | 6/2011 | Tseng et al. |
| D673,157 S   | 12/2012 | Lu et al. |
| D673,158 S   | 12/2012 | Yang et al. |

(Continued)

FOREIGN PATENT DOCUMENTS

WO   2010/036090 A1   4/2010

OTHER PUBLICATIONS

Squirrel, "Origami iPad Sleeve From Incase," Gaygadget (Nov. 4, 2010).

(Continued)

*Primary Examiner* — David Fidei
(74) *Attorney, Agent, or Firm* — Novak Druce Connolly Bove + Quigg LLP

(57) ABSTRACT

A holder includes a first outer sheet, a second outer sheet, and a handled portion. A base portion, a first supporting portion and a second supporting portion are formed on the second outer sheet. A latching piece is formed on the base portion, the latching piece having a bendable portion. The first supporting portion is folded relative to the base portion, and the second supporting portion is folded relative to the first supporting portion until the second supporting portion is held by the latching piece, the base portion, the first supporting portion and the second supporting portion cooperatively form a three-dimensional structure that can support the portable electronic device at an angle relative to the second outer sheet without collapsing.

9 Claims, 8 Drawing Sheets

(56) References Cited

U.S. PATENT DOCUMENTS

| | | |
|---|---|---|
| D674,396 S | 1/2013 | Yang et al. |
| D674,802 S | 1/2013 | Lu et al. |
| 8,393,464 B2 | 3/2013 | Yang et al. |
| D679,279 S | 4/2013 | Yang et al. |
| 2006/0285283 A1* | 12/2006 | Simonian et al. ............. 361/679 |
| 2011/0163642 A1 | 7/2011 | Rohrbach et al. |
| 2011/0266194 A1 | 11/2011 | Bau |
| 2012/0146466 A1 | 6/2012 | Lu et al. |
| 2012/0211613 A1 | 8/2012 | Yang et al. |
| 2012/0211631 A1 | 8/2012 | Lu et al. |

OTHER PUBLICATIONS

Incase,"Introducing the Convertibel Magzine Jacket for ipad", Incase website(Nov. 23, 2010).

\* cited by examiner

HOLDER FOR PORTABLE ELECTRONIC DEVICE

CROSS-REFERENCE TO RELATED APPLICATIONS

This application is related to co-pending U.S. patent application Ser. Nos. 13/862,876, 13/862,890 and 13/862,885, all entitled "HOLDER FOR PORTABLE ELECTRONIC DEVICE", and all invented by CHUEH LEE. All these related applications have the same assignee as the present application and have been concurrently filed herewith. The above-identified applications are incorporated herein by reference.

BACKGROUND

Technical Field

This disclosure relates to holders for portable electronic devices, particularly to a multifunction holder for protecting and supporting portable electronic devices.

Holders are widely used to protect portable electronic devices and support the portable electronic device for a user to, for example, read an eBook or watch video. However, it can be difficult to carry the holder and the electronic device at the same time.

Therefore, there is room for improvement within the art.

BRIEF DESCRIPTION OF THE DRAWINGS

Many aspects of the holder can be better understood with reference to the following drawings. The components in the drawings are not necessarily drawn to scale, the emphasis instead being placed upon clearly illustrating the principles of the holder.

DETAILED DESCRIPTION

Figure 1:
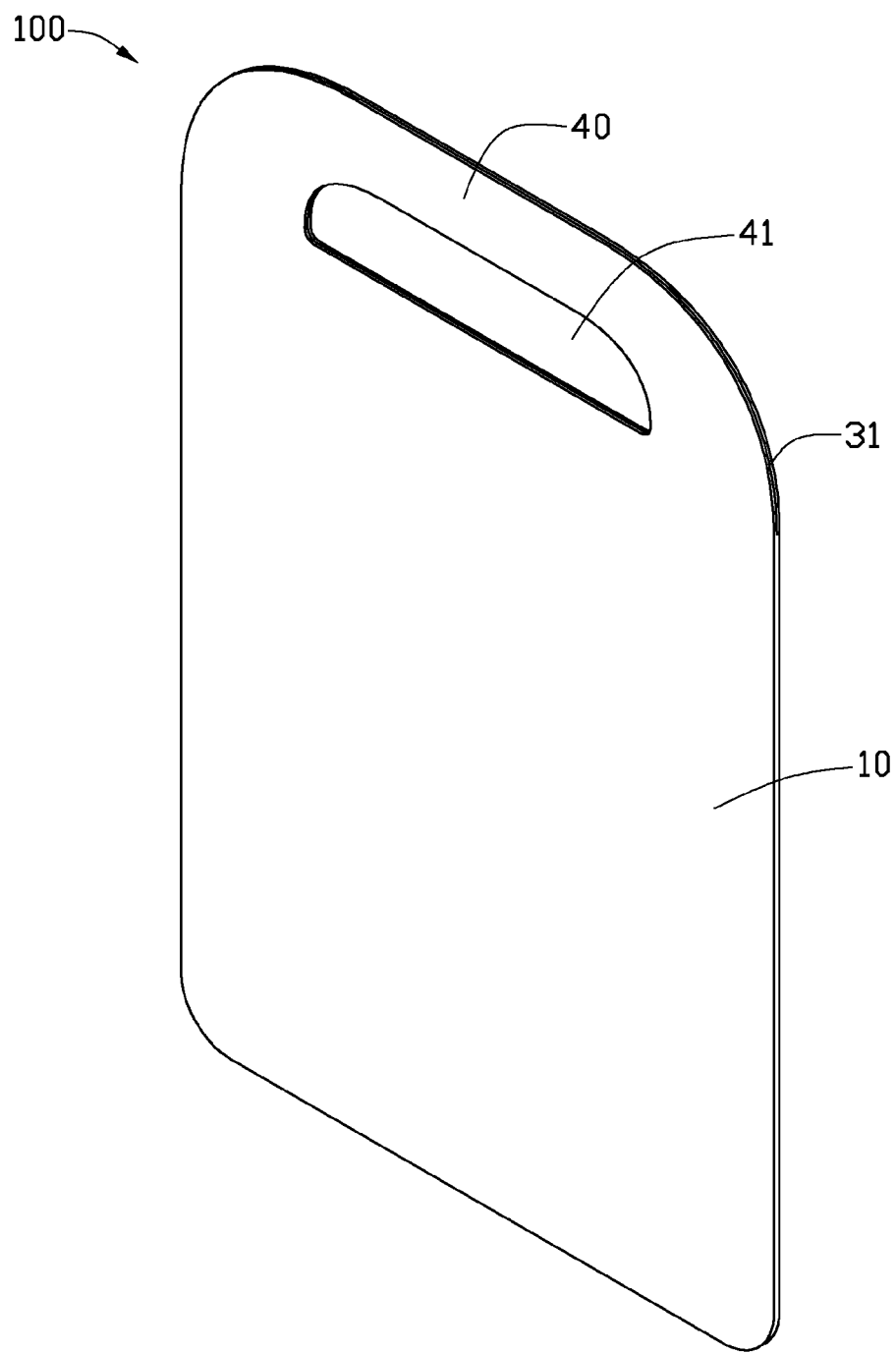
FIG. 1 is an isometric view of a holder, in accordance with an exemplary embodiment.
Figure 2:
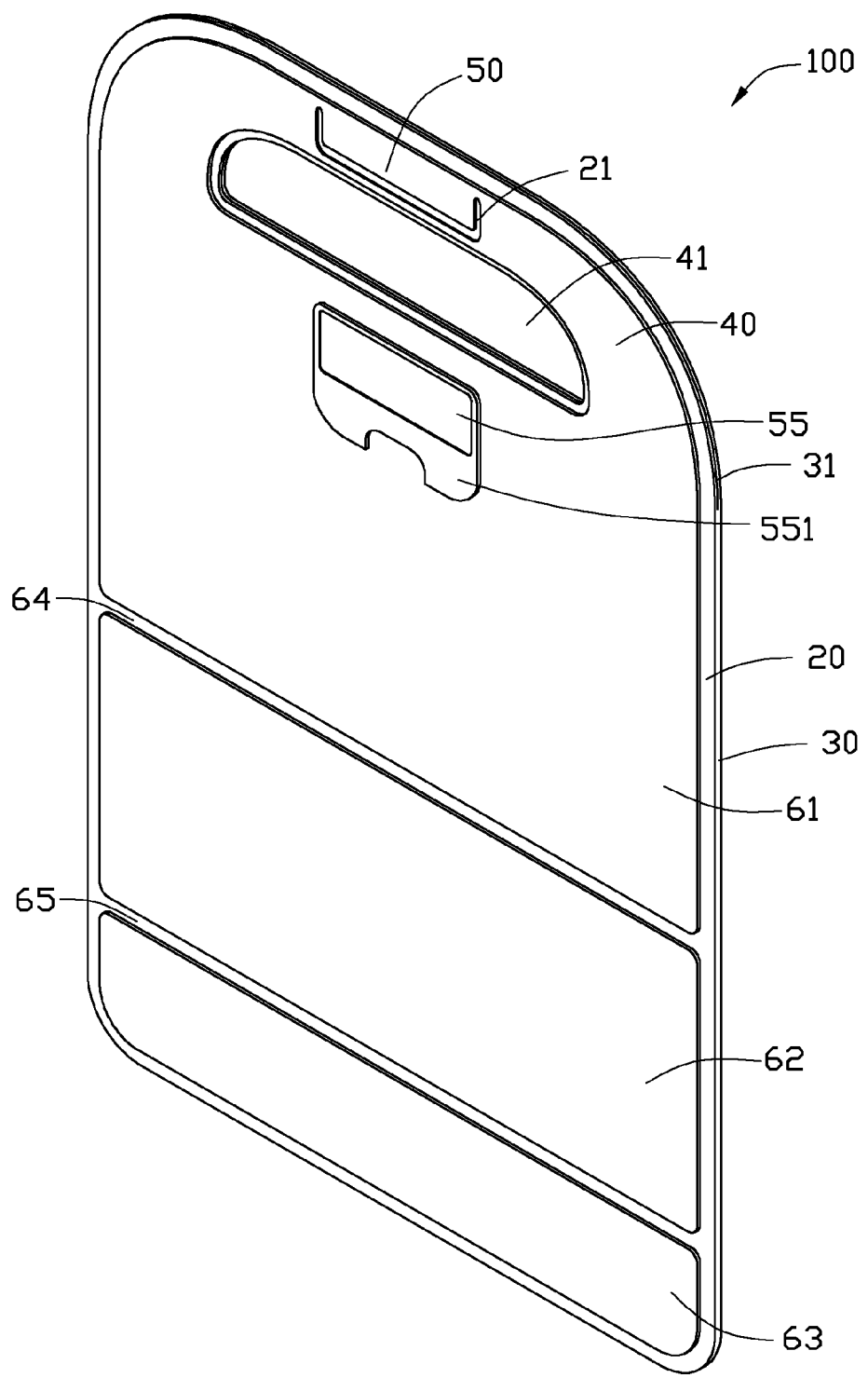
FIG. 2 is similar to FIG. 1, but shown from another aspect.

FIGS. 1 and 2 show an exemplary embodiment of a holder 100. The holder 100 can receive and protect a portable electronic device 200, and can also support and hold the portable electronic device 200.

Figure 3:
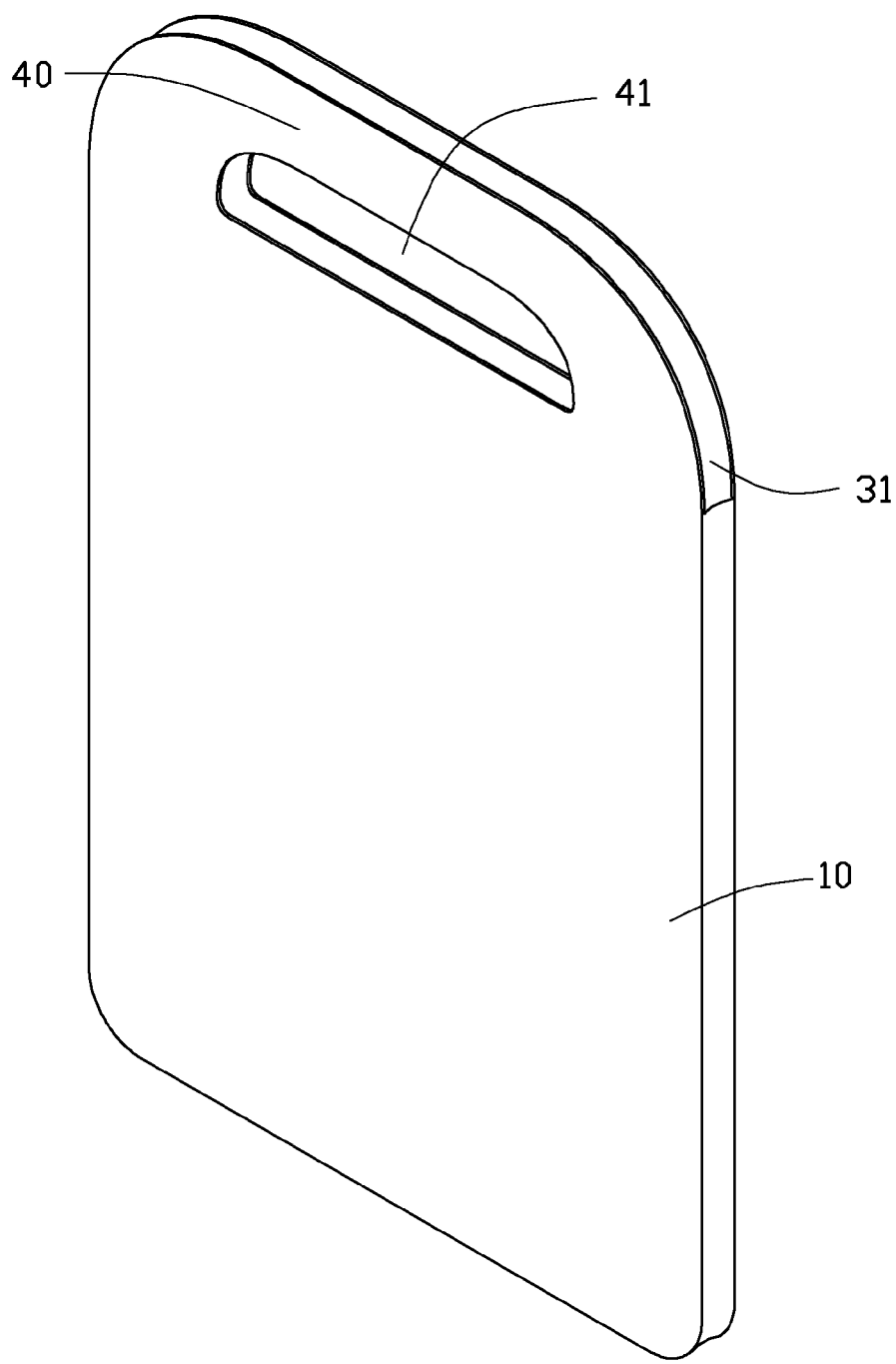
FIG. 3 is an isometric view of the holder, showing the holder for receiving a portable electronic device.

Also referring to FIGS. 2 and 3, the holder 100 includes a first outer sheet 10, a second outer sheet 20, an expandable portion 30, and a handled portion 40. A receiving space (not labeled) is defined between the second outer sheet 20 and the first outer sheet 10 and surrounded by the expandable portion 30 for receiving the portable electronic device 200. The second outer sheet 20 and the first outer sheet 10 are connected to each other along their edges by the expandable portion 30, leaving an entrance 31 that allows the portable electronic device 200 to be inserted into the receiving space. The holder 100 shown herein for illustrative purpose includes the first outer sheet 10 and the expandable portion 30; however, the expandable portion 30 may be omitted and the first and second outer sheets 10, 20 connected to each other along their perimeters. In another example, if the holder 100 is not used for receiving the portable electronic device 200 therein, only one of the first outer sheet 10 and the second outer sheet 20 may also be used. The first outer sheet 10, the expandable portion 30, and the second outer sheet 20 are made of soft material, e.g., fiber, cotton, vinyl, thermoplastics.

The handled portion 40 includes two extending sheets, one extending sheet extending from the first outer sheet 10 and the other extending sheet extending from the second outer sheet 20. The handled portion 40 defines a through hole 41 passing through the two extending sheets. The through hole 41 makes the holder 100 convenient to carry. To lock the handled portion 40, two attractive magnet members may be attached to the two extending sheets for preventing the portable electronic device 100 from separating from the entrance 31.

Figure 6:
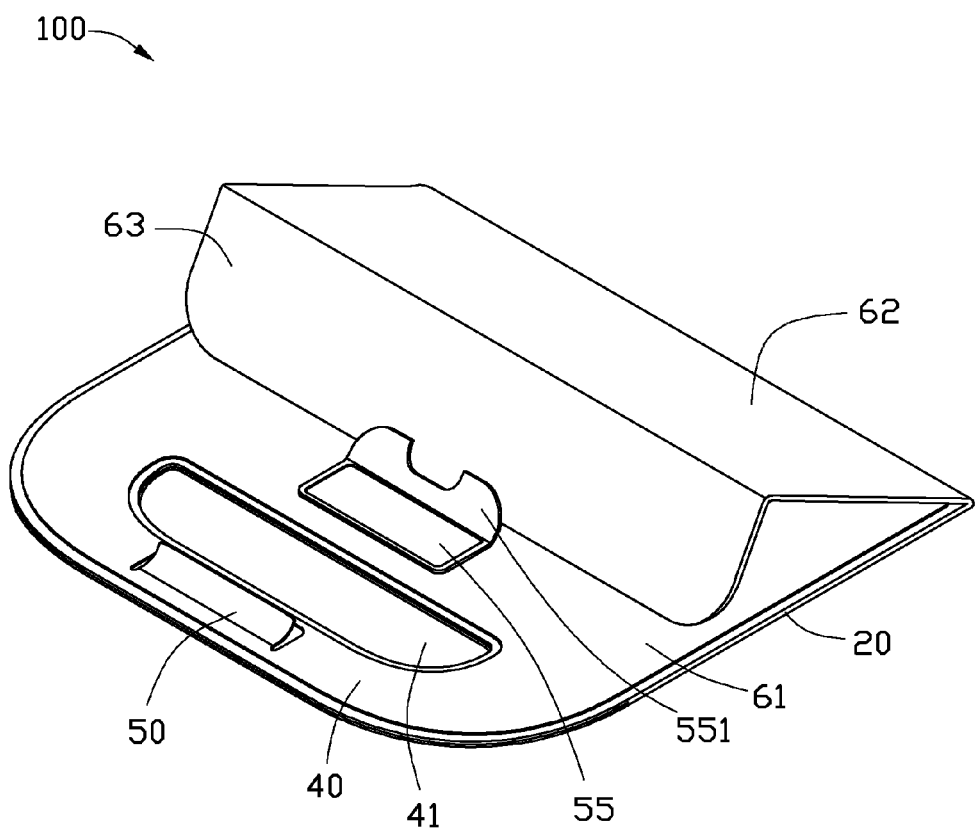
FIG. 6 is similar to FIG. 5, showing the latching portion of the holder to be bent.
Figure 8:
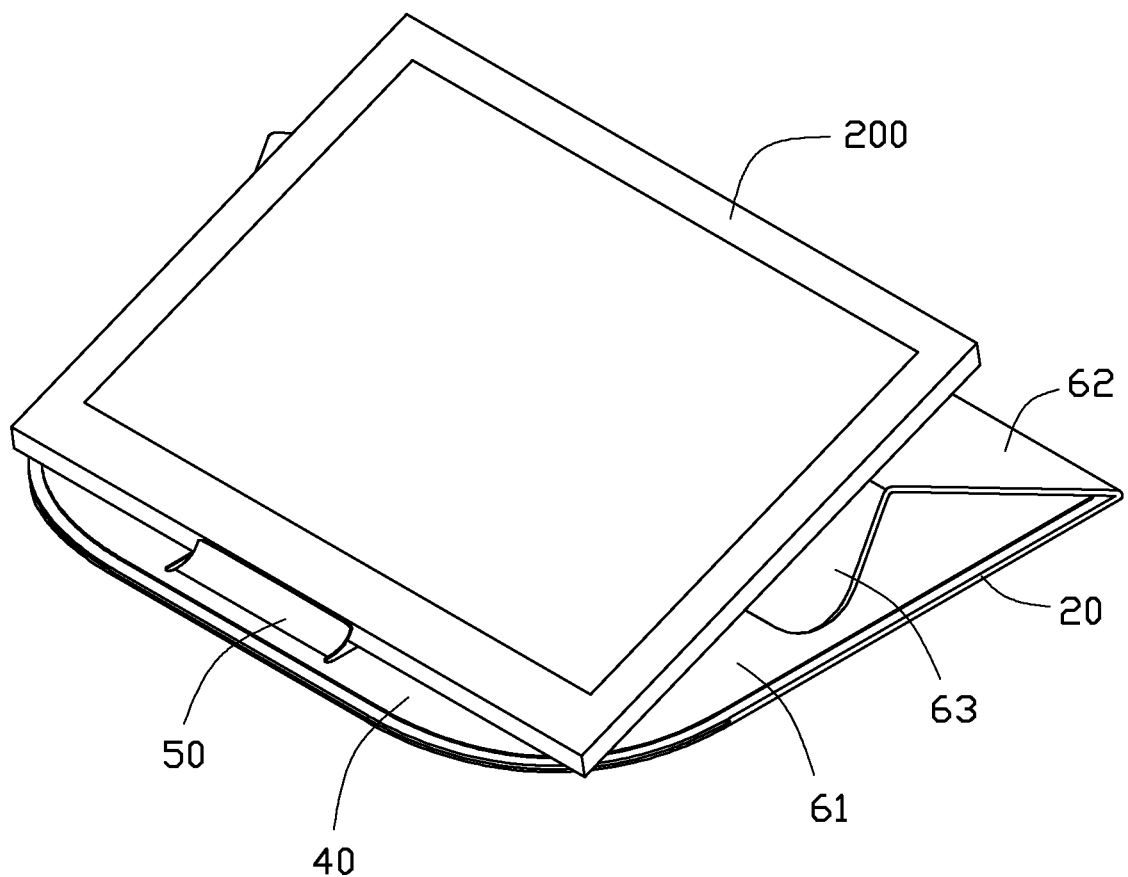
FIG. 8 shows the holder supporting the portable electronic device in a second state.

The handled portion 40 defines a slot 21 on one side of the through hole 41. A tongue portion 50 is formed in the slot 21. One edge of the tongue portion 50 is connected to the handled portion 40. Referring to FIGS. 6 and 8, the tongue portion 50 may be bent away from the handled portion 40 to allow the portable electronic device 200 to be supported by the tongue portion 50.

A plurality of foldable portions are formed on the second outer sheet 20. The foldable portions are parallel with each other when the holder is in a flat configuration and foldable relative to each other. When the foldable portions are folded relative to each other, the foldable portions cooperatively form a three-dimensional structure that can support the portable electronic device at an angle relative to the second outer sheet 20 without collapsing. Referring to FIG. 2, the foldable portions includes a base portion 61, a first supporting portion 62 and a second supporting portion 63. The base portion 61, the first supporting portion 62 and the second supporting portion 63 are made of rigid material.

In the exemplary embodiment, the base portion 61 is adjacent to the handled portion 40. The first supporting portion 62 is positioned between the base portion 61 and the second supporting portion 63. A first folding region 64 is positioned between the base portion 61 and the first supporting portion 62, and a second folding region 65 is positioned between the first supporting portion 62 and the second supporting portion 63. The base portion 61, the first supporting portion 62 and the second supporting portion 63 can be folded relative to each other along the first folding region 64 and the second folding region 65. However, since the first supporting portion 62 and the second supporting portion 63 are made of rigid material, the first supporting portion 62 and the second supporting portion 63 cannot be folded themselves.

The base portion 61 has a latching piece 55 formed thereon adjacent to the handled portion 40. The latching piece 55 is positioned at another side of the through hole 41, and has a bendable portion 551. The bendable portion 551 may be bent away from the base portion 61 to allow the second supporting portion 63 to be supported thereon.

Referring to FIG. 3, when the portable electronic device 200 needs to be received in the holder 100, the handled portion 40 is opened to expose the entrance 31. The device 200 can then be inserted into the receiving space of the holder 100 via the entrance 31 for storage.

Figure 4:
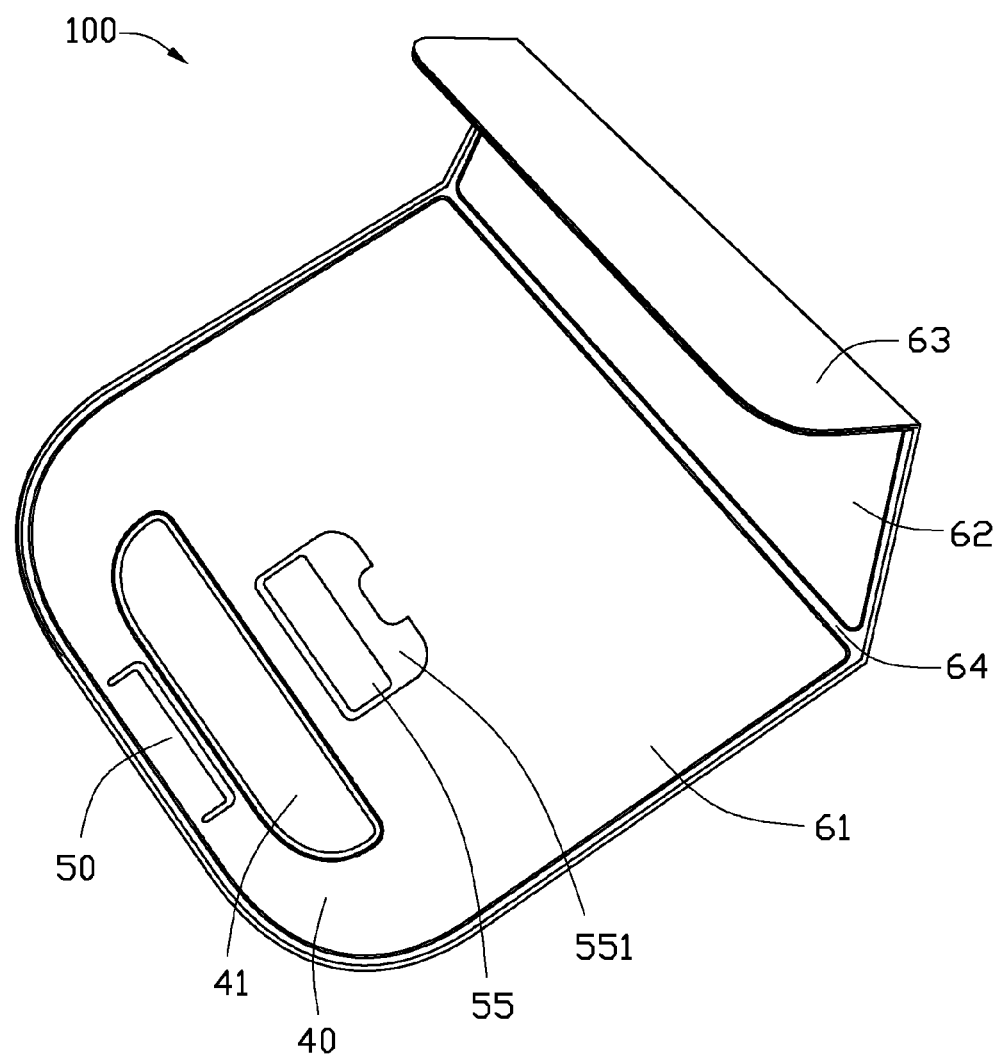
FIG. 4 is similar to FIG. 2, showing the holder in a state of being partially folded.
Figure 5:
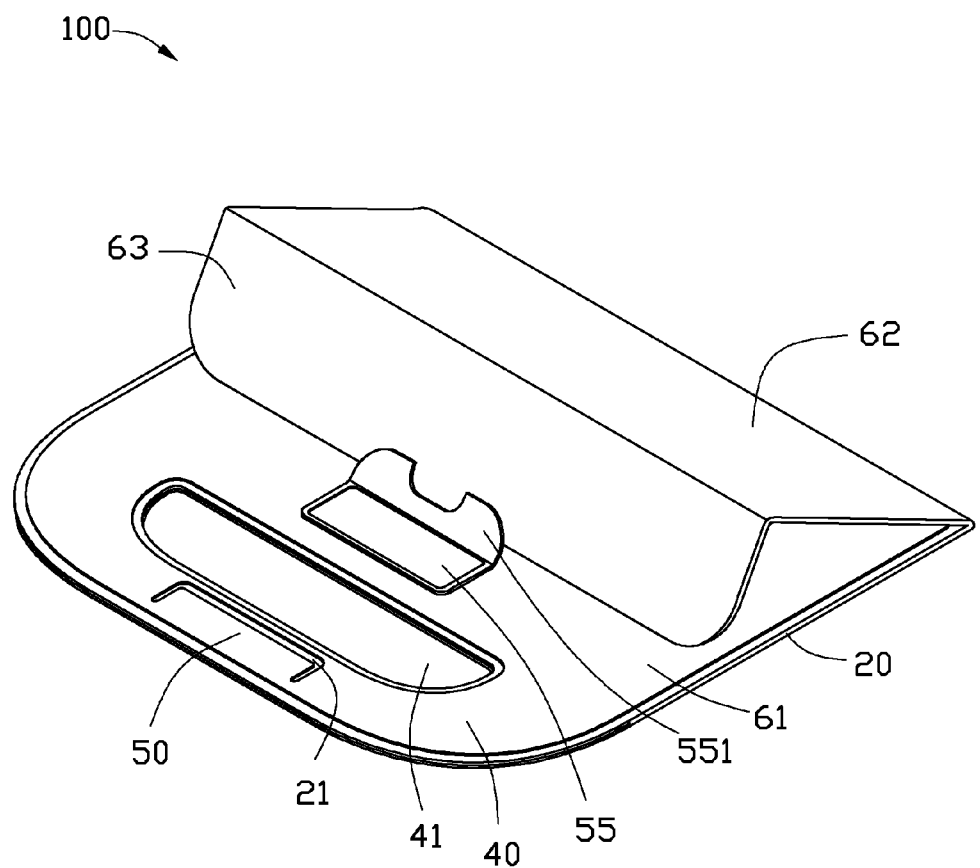
FIG. 5 is similar to FIG. 4, showing the holder folded as a support.
Figure 7:
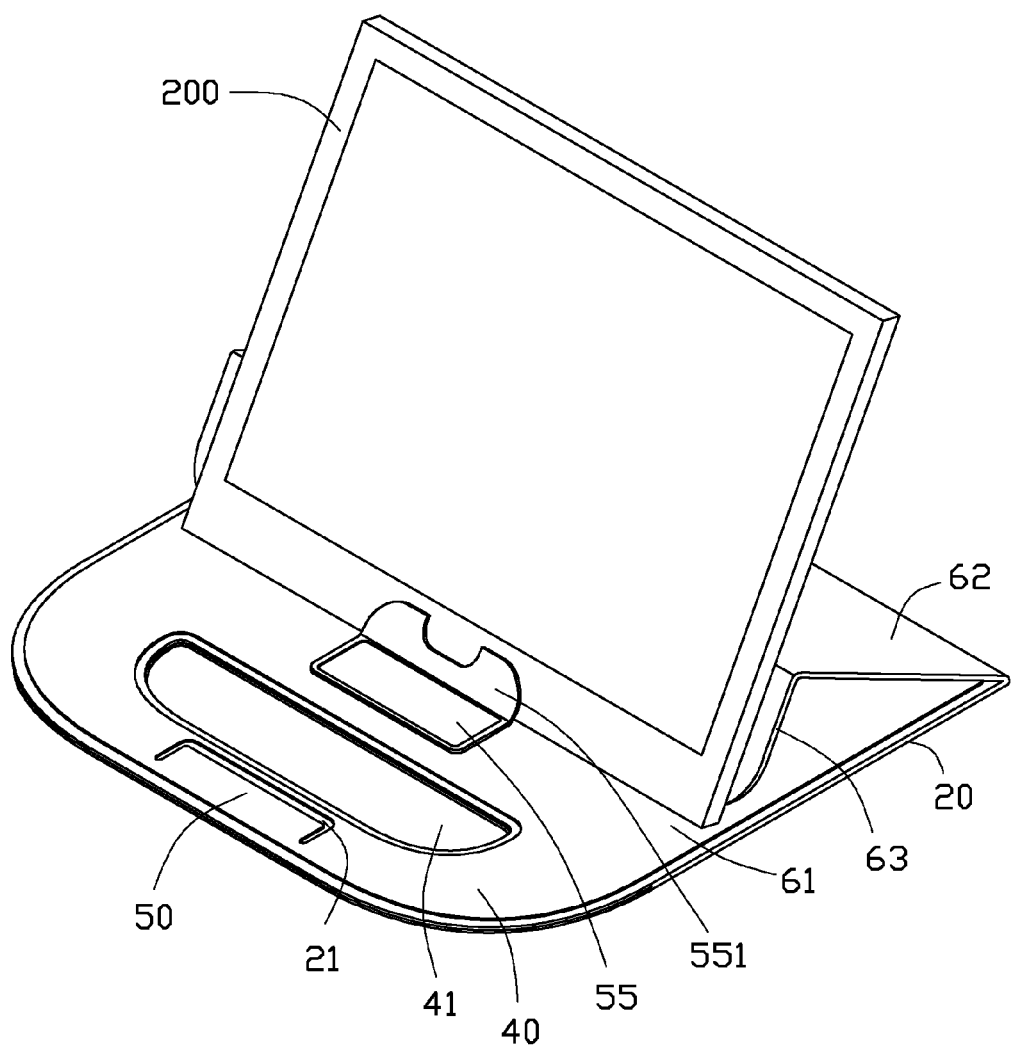
FIG. 7 shows the holder supporting the portable electronic device in a first state.

Also referring to FIGS. 4 and 5, to fold the holder 100 to form a support, the first supporting portion 62 and the second supporting portion 63 are folded toward the base portion 61 along the first folding region 64 and the second folding region 65 until the second supporting portion 63 stands on the base portion 63. The bendable portion 551 is folded to allow the second supporting portion 63 to be held on the bendable portion 551. Thus, the base portion 61, the first supporting portion 62 and the second supporting portion 63 can form a three-dimensional structure that will not collapse. Also referring to FIG. 7, the portable electronic device 200 is set on the holder 100 as a support. One end of the portable electronic device 200 is supported between the bendable portion 551 and the second supporting portion 62. The portable electronic device 200 is supported by the first supporting portion 62 and the second supporting portion 63 at an angle. Thus, users can comfortably view the display of the portable electronic device 200.

Referring to FIGS. 6 and 8, if the viewed angled of the portable electronic device 200 needs to be adjusted, the tongue portion 50 can be bent around the edge along a direction far away from the handled portion 40. The portable electronic device 200 is held on the tongue portion 50. Thus, users can comfortably view the display of the portable electronic device 200 at a different angle.

It is to be understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A holder for holding and supporting a portable electronic device, comprising:
    a first outer sheet;
    a second outer sheet;
    a handled portion extending from the first outer sheet and the second outer sheet configured for being handled;
    a base portion, a first supporting portion and a second supporting portion formed on the second outer sheet, the base portion, the first supporting portion and the second supporting portion parallel with each other and folded relative to each other; and
    a latching piece formed on the base portion, the latching piece having a bendable portion;
    wherein, the first supporting portion is folded relative to the base portion, and the second supporting portion is folded relative to the first supporting portion until the second supporting portion is held by the latching piece, the base portion, the first supporting portion and the second supporting portion cooperatively form a three-dimensional structure that can support the portable electronic device at an angle relative to the second outer sheet without collapsing; the handled portion defines a slot, and a tongue portion is formed in the slot, one edge of the tongue portion is connected to the handled portion, the tongue portion is bent away from the handled portion to allow the portable electronic device to be supported on the tongue portion.

2. The foldable holder as claimed in claim 1, wherein an entrance is defined between the first outer sheet and the second outer sheet, the handled portion defines a through hole for being handled.

3. The foldable holder as claimed in claim 2, wherein the slot is located at one side of the through hole.

4. The foldable holder as claimed in claim 1, wherein a first folding region is formed between the base portion and the first supporting portion, a second folding region is formed between the first supporting portion and the second supporting portion.

5. The foldable holder as claimed in claim 1, wherein the first outer sheet and the second outer sheet are made from one or more materials selected from a group consisting of fiber, cotton, vinyl, thermoplastics.

6. A foldable holder for holding and supporting a portable electronic device, comprising:
    a first outer sheet and a second outer sheet connected to the first outer sheet, a receiving space and an entrance being defined between the first outer sheet and the second outer sheet for receiving the portable electronic device, the entrance communicating with the receiving space, the entrance allowing the portable electronic device to be inserted into the receiving space;
    a plurality of foldable portions formed on the second outer sheet, the foldable portions parallel with each other when the holder is in a flat configuration and foldable relative to each other;
    a latching piece formed on the second outer sheet, the latching piece having a bendable portion;
    wherein, the foldable portions are folded relative to each other until one of the foldable portions is held by the latching piece, the foldable portions cooperatively form a three-dimensional structure that can support the portable electronic device at an angle relative to the second outer sheet without collapsing; the handled portion defines a slot, and a tongue portion is formed in the slot, one edge of the tongue portion is connected to the handled portion, the tongue portion is bent away from the handled portion to allow the portable electronic device to be supported on the tongue portion.

7. The foldable holder as claimed in claim 6, further comprising a handled portion, wherein the handled portion extends from the first outer sheet and the second outer sheet, a through hole is defined in the handled portion for being handled.

8. The foldable holder as claimed in claim 7, wherein the slot is located at one side of the through hole.

9. The foldable holder as claimed in claim 8, wherein the foldable portions include a base portion, a first supporting portion and a second supporting portion, a first folding region is formed between the base portion and the first supporting portion, a second folding region is formed between the first supporting portion and the second supporting portion.

* * * * *